(12) United States Patent
Yang

(10) Patent No.: US 8,243,721 B2
(45) Date of Patent: Aug. 14, 2012

(54) JITTER BUFFER AND JITTER BUFFER CONTROLLING METHOD

(75) Inventor: Jeng-Shyan Yang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 875 days.

(21) Appl. No.: 12/346,765

(22) Filed: Dec. 30, 2008

(65) Prior Publication Data

US 2009/0316689 A1    Dec. 24, 2009

(30) Foreign Application Priority Data

Jun. 18, 2008    (CN) .......................... 2008 1 0302185

(51) Int. Cl.
*H04L 12/56*    (2006.01)
*H04L 12/66*    (2006.01)
*H04J 3/06*    (2006.01)
(52) U.S. Cl. .......................... 370/352; 370/516; 370/519
(58) Field of Classification Search .................. None
See application file for complete search history.

(56) References Cited

U.S. PATENT DOCUMENTS

| | | | |
|---|---|---|---|
| 6,940,826 B1 * | 9/2005 | Simard et al. ................. | 370/260 |
| 6,977,948 B1 * | 12/2005 | Chennubhotla et al. ...... | 370/516 |
| 7,570,670 B2 * | 8/2009 | Schwartz ...................... | 370/516 |
| 2005/0002409 A1 * | 1/2005 | Lai et al. ....................... | 370/412 |
| 2005/0047397 A1 * | 3/2005 | Sim et al. ...................... | 370/352 |
| 2006/0074681 A1 * | 4/2006 | Janiszewski et al. .......... | 704/270 |
| 2007/0019931 A1 * | 1/2007 | Sirbu ............................. | 386/96 |
| 2009/0129375 A1 * | 5/2009 | Mohanty et al. .............. | 370/356 |

* cited by examiner

*Primary Examiner* — Chi Pham
*Assistant Examiner* — Soon-Dong Hyun
(74) *Attorney, Agent, or Firm* — Altis Law Group, Inc.

(57) ABSTRACT

A method of controlling a jitter buffer includes writing, buffering and reading data having a series of voice data frames. Writing and buffering the data is executed synchronously and repeatedly. Writing the data includes detecting whether the data packet is normally received, and calculating a storage address for each of the voice frames. Buffering the data includes buffering the voice frames in a corresponding storage address calculated in the data writing. Reading the data includes transmitting the voice data frames to a voice digital processor (VDSD) for playing.

15 Claims, 5 Drawing Sheets

JITTER BUFFER AND JITTER BUFFER CONTROLLING METHOD

BACKGROUND

1. Technical Field

Embodiments of the present disclosure relate to the field of internet protocol technology, and more particularly to a jitter buffer controlling method.

2. Description of Related Art

A jitter buffer plays an important role in voice over internet protocol (VoIP) applications, because the jitter buffer provides a key mechanism for achieving good speech quality to meet technical and commercial requirements. In a conventional static jitter buffer, a fixed delay is adopted for speech. When the fixed delay of the jitter buffer is large, speech cannot be played timely by a voice digital signal processor (VDSP). On the other hand, when the fixed delay is small, tolerance of the jitter buffer would be bad, and data packet loss rate of speech is increased if the jitter buffer was large. That is, the fixed delay does not ensure quality speech processing. To overcome the drawbacks of the static jitter buffer, dynamic jitter buffers have been developed. Dynamic jitter buffers parse the speech to talk-spurt and silence-spurt, which can be detected by a voice activity detecting (VAD) function of the jitter buffer. A data packet transmission delay of the speech can be adjusted during a silence-spurt. However, the VDSP cannot identify talk-spurts and silence-spurts when the VAD function is not working.

Therefore, what is needed is a jitter buffer controlling method, which can enhance the speech processing quality without a working VAD function.

DETAILED DESCRIPTION OF CERTAIN INVENTIVE EMBODIMENTS

Figure 1:
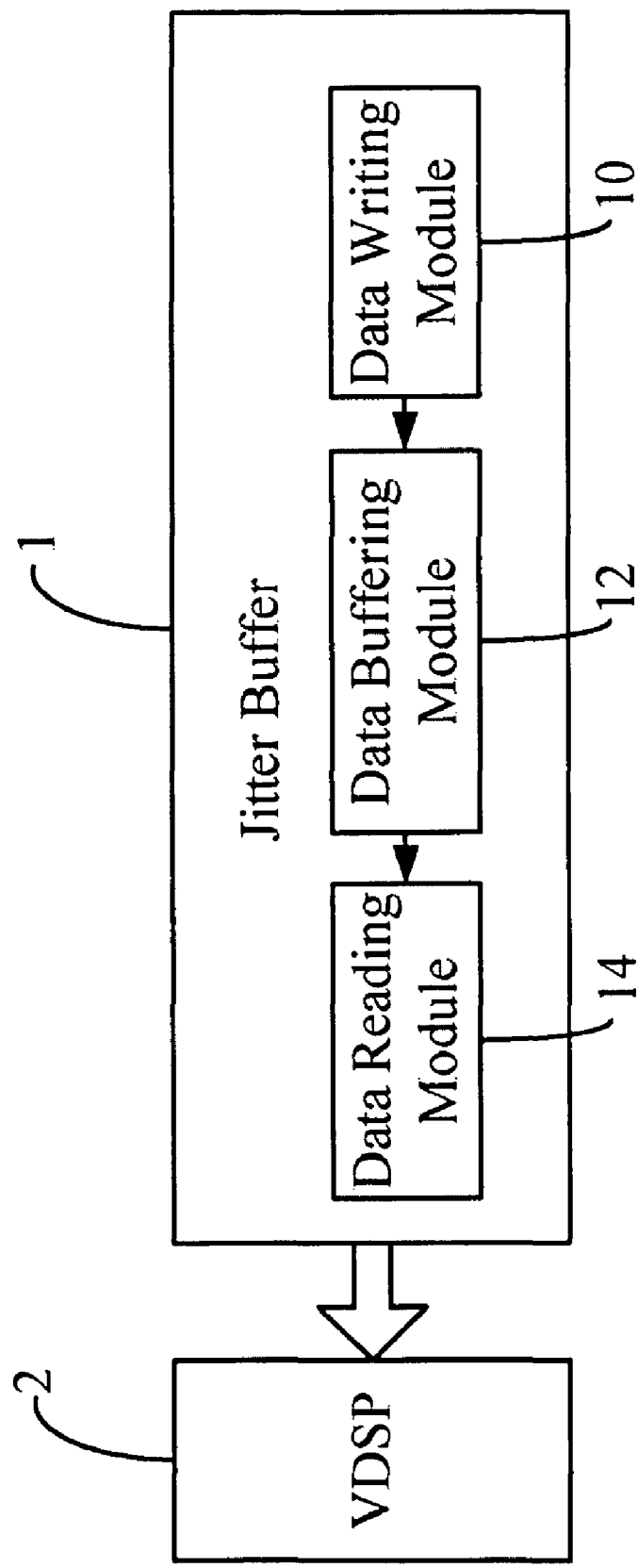
FIG. 1 is a schematic diagram of one embodiment of running environment of a jitter buffer.

The components in the drawings are not necessarily drawn to scale, the emphasis instead being placed upon clearly illustrating the principles of at least one embodiment. In the drawings, like reference numerals designate corresponding parts throughout the various views.

FIG. 1 is a schematic diagram of one embodiment of an application environment of a jitter buffer 1. The jitter buffer 1 electrically connects with a voice digital signal processor (VDSP) 2, and is used for executing to write data to a storage address, buffer data, and read data from a read position of the jitter buffer 1. The execution of writing and reading data are executed by the jitter buffer 1 synchronously and repeatedly.

In the embodiment, the jitter buffer 1 may include a data writing module 10, a data buffering module 12, and a data reading module 14.

The data writing module 10 is configured for receiving data packets from an internet protocol (IP) network. In the embodiment, each of the data packets contains a timestamp, which represents a corresponding time that the data packet is received by the jitter buffer 1. The timestamp of the data packet, which is currently received by the data write module 10, is symbolically depicted as a packet timestamp TSw. The data packet may include a serial of voice data frames, and each of the voice data frames has a voice timestamp. For example, if the data packet includes two voice data frames and the first voice data frame has the voice timestamp TS, the voice timestamp of the second voice data frame may equal "TS+SPF." The voice timestamp of the voice data frame, which is just read out from the jitter buffer 1, is symbolically depicted as TSr.

In the embodiment, "SPF" is a sample per frame, and represents a time interval between two consecutive voice data frames that are transmitted to the VDSP 2. For example, in one data packet, if a sample of the voice data frames in the data packet is equal to eighth milliseconds, each of the voice data frames can be transmitted for five milliseconds, the "SPF" may equal forty by executing a formula of SPF=5/(⅛). In the embodiment, each of the voice data frames can be transmitted for five milliseconds or ten milliseconds.

The data writing module 10 is further configured for detecting whether each of the data packets is normally received according to the packet timestamp TSw of each of the data packets, the voice timestamp TSr, and a delay depth (symbolically depicted as "Dn") of the jitter buffer 1. The data writing module 10 is also configured for calculating a storage address in the jitter buffer 1 to store each of the voice data frames contained in the data packet according to the detection results, and adjusting (i.e., increasing or decreasing) the delay depth Dn of the jitter buffer 1.

In one embodiment, a real-time transport protocol (RTP) is adopted in the data packet transmission. That is, the data packets can be described as RTP data packets.

In the embodiment, the data buffering module 12 is equivalent to an intermediate station, and is configured for buffering the voice data frames and saving each of the voice data frames in a corresponding storage address calculated by the data writing module 10.

The data reading module 14 is configured for detecting whether any voice data frame is output from the jitter buffer 1 to the VDSP 2 by checking the voice timestamp TSr, and transmitting the voice data frames to the VDSP 2 for playing.

The VDSP 2 receives all of the voice data frames, decodes and plays the voice data frames sent from the data reading module 14.

In the embodiment, the jitter buffer 1 further includes a counter that is configured for recording a total number of the voice data frames transmitted to the VDSP 2. For example, after the data reading module 14 transmits one voice data frame to the VDSP 2, the counter of the jitter buffer 1 is increased by one.

In order to clearly illustrate the embodiment, more functions of the data writing module 10, the data buffering module 12 and the data reading module 14 are detailed below in reference to FIGS. 2-5.

Figure 2:
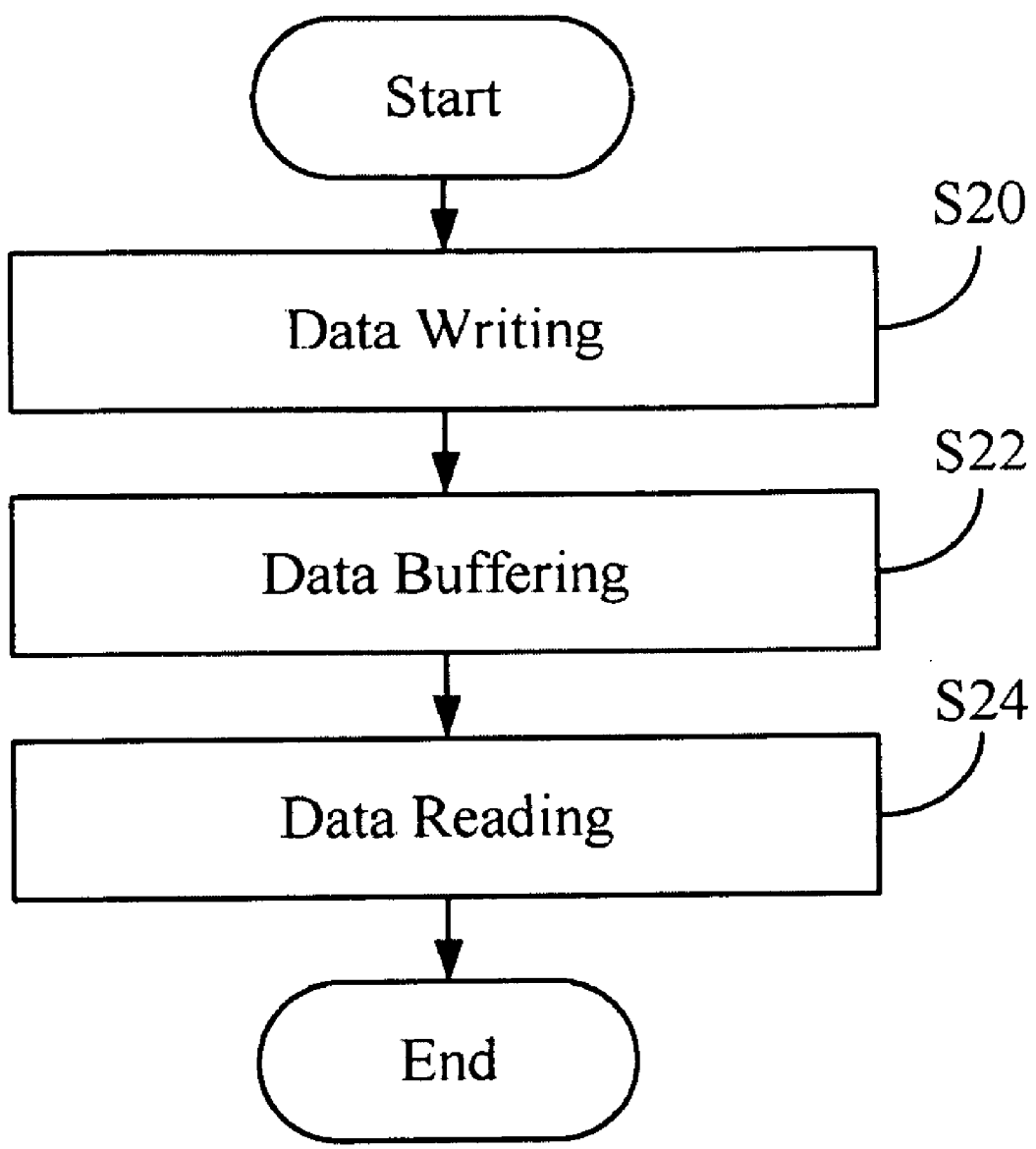
FIG. 2 is a flowchart of one embodiment of a jitter buffering controlling method.

FIG. 2 is a flowchart of one embodiment of a jitter buffering controlling method by implementing the jitter buffer 1 of FIG. 1 as described above. Depending on the embodiment, additional blocks may be added, others removed, and the ordering of the blocks may be changed. By implementing the method, the delay depth Dn of the jitter buffer 1 can be adjusted to achieve a compromise between a data packet delay and a data packet loss rate.

In block S20, the data writing module 10 executes a data writing step. In the embodiment, the data writing module 10 receives a data packet from the IP networks, detects whether the data packet is normally received according to a packet timestamp TSw of the data packet, a voice timestamp TSr of a voice data frame that is just read out from the jitter buffer 1, and a delay depth Dn of the jitter buffer 1. The data writing module 10 then process the packet in a frame-basis and calculates a storage address to store each of the data voice frames according to the detection result, and adjusts the delay depth Dn of the jitter buffer 1.

In block S22, the data buffering module 12 executes a data buffering step. In the embodiment, the data buffering module 12 buffers the voice data frames contained in the data packet into the jitter buffer 1, and stores each of the voice data frames in the corresponding storage address which is calculated by the data writing module 10.

In block S24, the data reading module 14 executes a data buffering step. In the embodiment, the data reading module 14 detects whether any voice data frame is output from the jitter buffer 1 to the VDSP 2 by checking the voice timestamp TSr of the voice data frame that is just read out from the jitter buffer 1, and transmits the voice data frames to the VDSP 2 for playing if any voice data frames are output to the VDSP 2.

Figure 3:
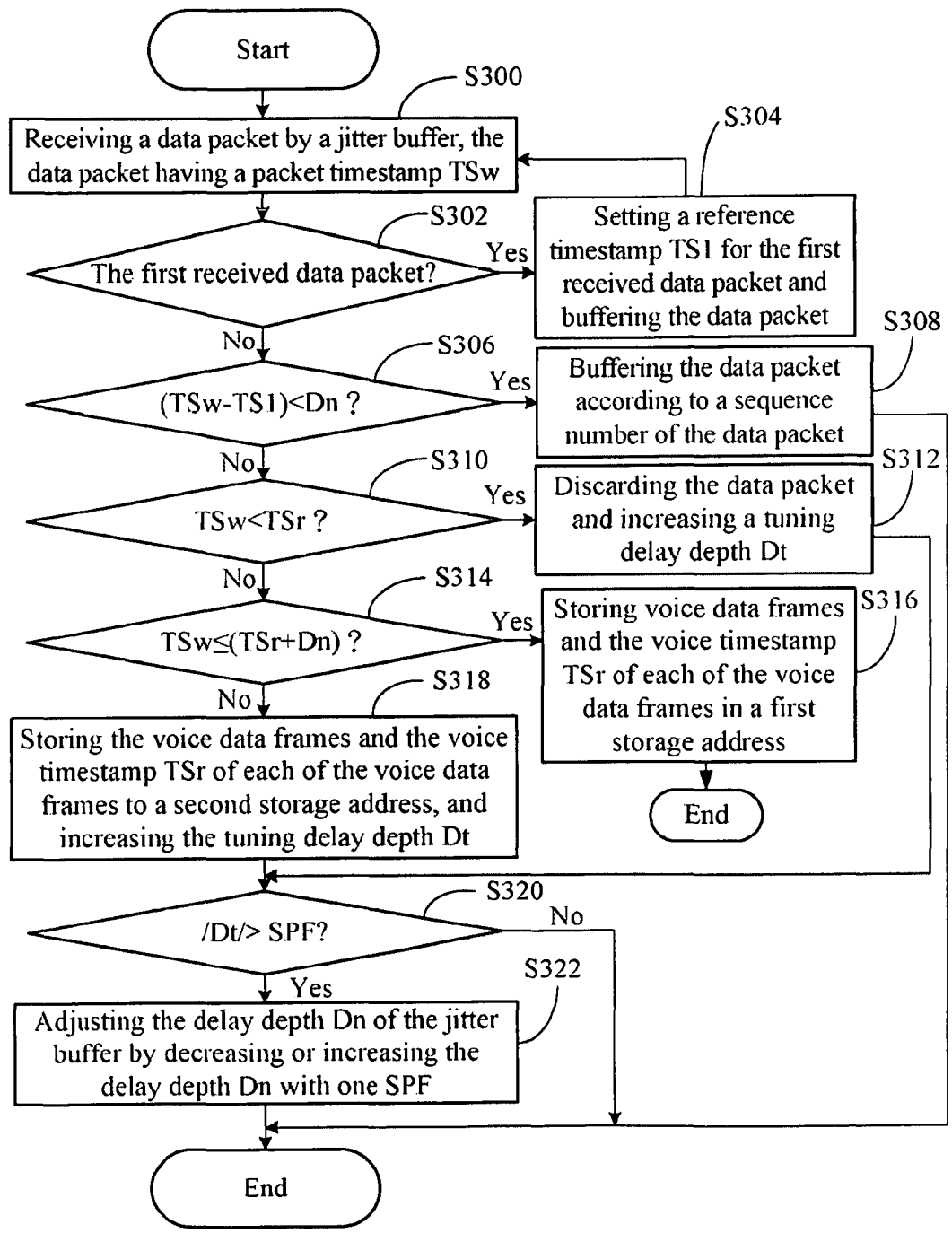
FIG. 3 is a flowchart of one embodiment of a data writing step and a data buffering step of FIG. 2 in detail.

FIG. 3 is a flowchart of one embodiment of the data writing step and the data buffering step of FIG. 2 in detail. In block S300, the data writing module 10 receives the data packet that comprises several voice data frames from the IP networks.

In block S302, the data writing module 10 detects whether the data packet is the first received data packet. If the data packet is the first received data packet, the flow may move to block S304. Otherwise, if the data packet is not the first received data packet, the flow may move to block S306.

In block S304, the data writing module 10 saves the data packet in a pre-buffering phase of the jitter buffer 1 for buffering, sets a reference timestamp (symbolically depicted as "TS1") for the first received data packet, and the flow may return block S300 to receive other data packets.

In block S306, the data writing module 10 determines whether a difference (symbolically depicted as "TSw−TS1") between the packet timestamp TSw and the reference timestamp TS1 is less than the delay depth Dn of the jitter buffer 1. If the difference (TSw−TS1) is less than the delay depth Dn, the flow may move to block S308. Otherwise, if the difference (TSw−TS1) is no less than the delay depth Dn, the flow may move to block S310.

In block S308, the data writing module 10 determines that the data packet is in the pre-buffering phase, the data buffering module 12 buffers the data packet according to a sequence number of the data packet, and the flow ends. In the embodiment, the sequence number represents a serial number of the data packet transmitted from the IP networks.

In block S310, the data writing module 10 determines whether the packet timestamp TSw is less than a voice timestamp TSr.

If the packet timestamp TSw is less than the voice timestamp TSr, namely the data packet was delayed, in block S312, the data writing module 12 discards the data packet, and increases a tuning delay depth (symbolically depicted as "Dt") of the jitter buffer 1 by adding an adjustment value, and then the flow may directly move to block S320. In the embodiment, the adjustment value equals SPF/2", where "n" is an integer, and a range of "n" is between zero and eight.

If the packet timestamp TSw is not less than the voice timestamp TSr, in block S314, the data writing module 10 determines whether the packet timestamp TSw is greater than a sum value of the delay depth Dn and the voice timestamp TSr (symbolically depicted as "TSr+Dn"). If the packet timestamp TSw is not greater than the sum value (TSr+Dn), the flow may move to block S316. Otherwise, if the packet timestamp TSw is greater than the sum value (TSr+Dn), the flow may move to block S318.

In block S316, the data buffering module 12 stores the voice data frames and the voice timestamp TSr for each of the voice data frames to a first storage address, and the flow ends. In the embodiment, the first storage address is calculated by a formula as follows: (TSw−TSr)/SPF+ReadIdx, wherein "ReadIdx" represents a storage address of the voice data frame that is at a read position of the jitter buffer 1, namely the voice data frame is now read out by the data reading module 14.

In block S318, the data writing module 10 increases the tuning delay depth Dt of the jitter buffer 1 with the adjustment value, and the data buffering module 12 stores the voice data frames contained in the data packet and the voice timestamp TSr for each of the voice data frames to a second storage address. In the embodiment, the second storage address is calculated by a formula as follows: Dn/SPF+ReadIdx.

In block S320, the data writing module 10 determines whether an absolute value of the tuning delay depth Dt is greater than the time interval SPF. If the absolute of the tuning delay depth Dt is greater than the time interval SPF, the flow may move to block S322. Otherwise, if the absolute value of the delay depth Dt is not greater than the time interval SPF, the flow may directly end.

In block S322, the data writing module 10 adjusts the delay depth Dn of the jitter buffer 1 by increasing or decreasing the delay depth Dn with one time interval SPF. For example, if the tuning delay depth Dt is negative value, the data writing module 10 adjusts the delay depth Dn of the jitter buffer 1 by decreasing the delay depth Dn with one time interval SPF. Otherwise, if the tuning delay depth Dt is positive value, the data writing module 10 adjusts the delay depth Dn by increasing the delay depth Dn with one time interval SPF.

In the embodiment, each of the packet timestamp TSw, the voice timestamp TSr, the reference timestamp TS1, and the current depth Dn of the jitter buffer 1 is an integral multiple of the time interval SPF.

Figure 4:
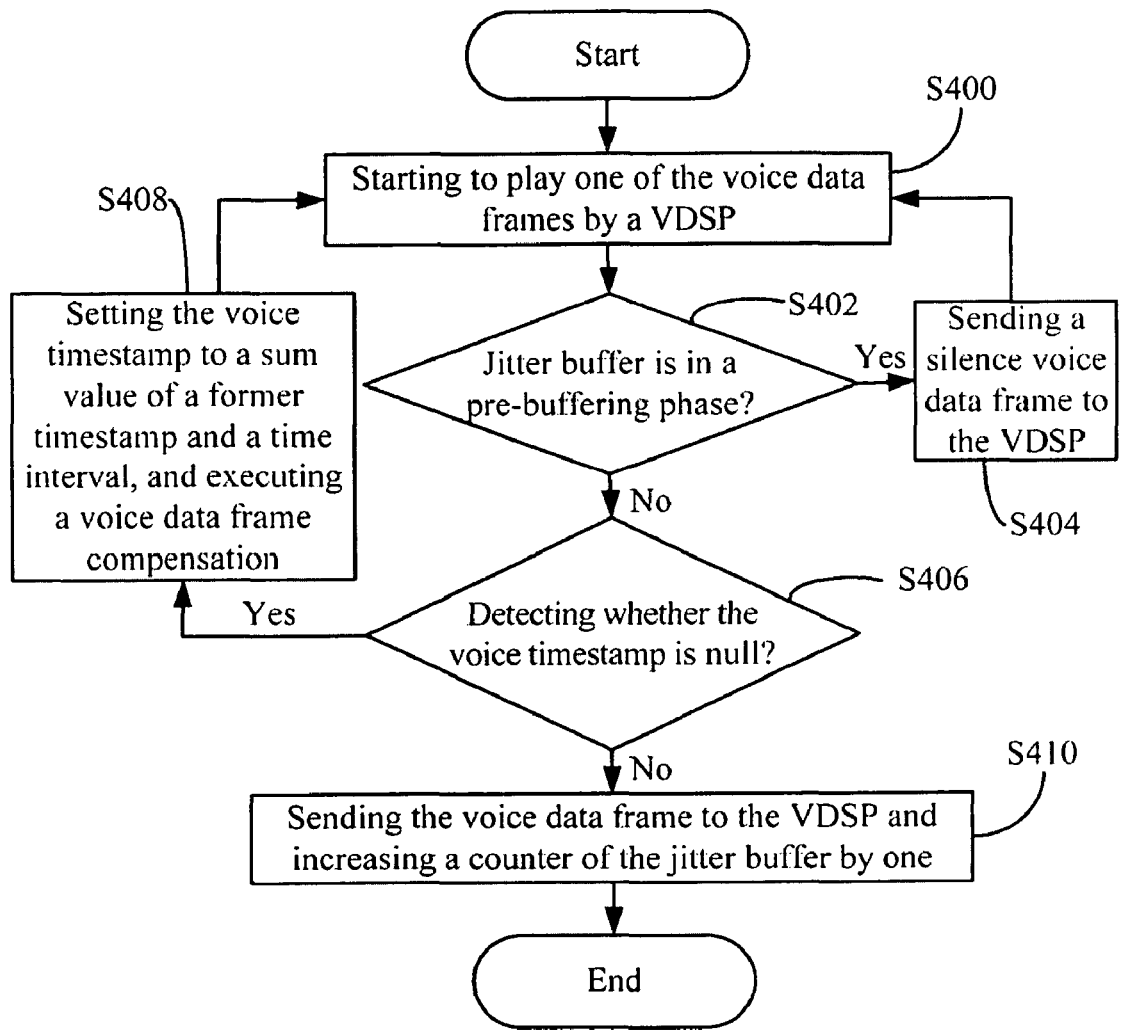
FIG. 4 is a flowchart of one embodiment of a data reading step of FIG. 2 in detail.

FIG. 4 is a flowchart of one embodiment of the data reading step of FIG. 2 in detail. In block S400, the VDSP 2 starts to play one of the voice data frames (symbolically depicted as "e"). That is, the voice data frame "e" is at the read position of the jitter buffer 1. In one embodiment, the voice data frame may be a silence voice data frame.

In block S402, the data reading module 14 detects whether the jitter buffer 1 is in the pre-buffering phase.

If the jitter buffer 1 is in the pre-buffering phase, in block S404, the data reading module 14 sends the silence voice data frame to the VDSP 2 to play, and then the flow returns to block S400. That is, the data reading module 14 sets the VDSP 2 in a silence-spurt.

Otherwise, if the jitter buffer 1 is not in the pre-buffering phase, in block S406, the data reading module 14 detects whether the voice timestamp TSr of the voice data frame "e" is null. If the voice timestamp TSr is null, the flow moves to block S408. Otherwise, if the voice timestamp TSr is not null, the flow moves to block S410.

In block S408, the data reading module 14 sets the voice timestamp TSr of the voice data frame "e" to a sum value of a former timestamp and the time interval SPF, records one voice data frame to be played, and executes a voice data frame compensation on the jitter buffer 1. In the embodiment, the former timestamp means a voice timestamp TSr of a former played voice data frame, and the former played voice data frame is read before the voice data frame "e." For example, the former played voice data fame may be a voice data frame "d."

In block S410, the data reading module 14 sends the voice data frame "e" to the VDSP 2 and increases the counter of the jitter buffer 1 by one.

Figure 5:
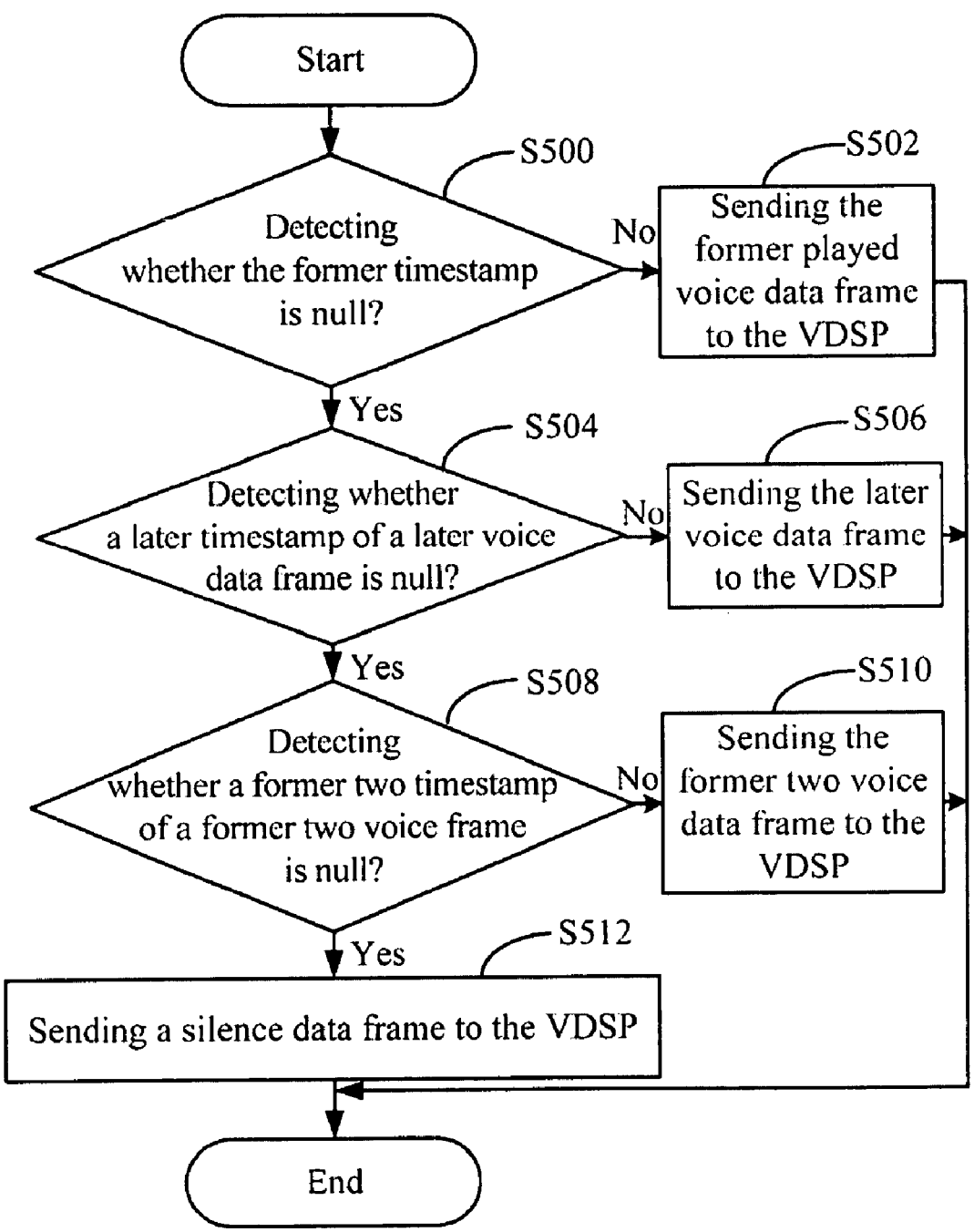
FIG. 5 is a flowchart of one embodiment of a method of voice data frame compensation of FIG. 4 in detail.

FIG. 5 is a flowchart of one embodiment of a method of the voice data frame compensation of FIG. 4 in detail. In block S500, the data reading module 14 detects whether the former timestamp of the former played voice data frame is null. If the former timestamp is null, the flow may move to block S504. Otherwise, if the former timestamp is not null, the flow may move to block S502.

In block S502, the data reading module 14 sends the former played voice data frame to the VDSP 2, and the flow directly ends.

In block S504, the data reading module 14 detects whether a later timestamp of a later voice data frame is null. If the later timestamp of the later voice data frame is not null, the flow may move to block S506. Otherwise, if the later timestamp of the later voice data frame is null, the flow may move to block S508. The later timestamp means a voice timestamp TSr of the later voice data frame, and the later voice data frame is read after the voice data frame "e." For example, the later voice data fame may be a voice data frame In block S506, the data reading module 14 sends the later voice data frame to the VDSP 2.

In block S508, the data reading module 14 detects whether a former two timestamp of a former two voice data frame is null. The former two timestamp means a voice timestamp TSr of the former two voice data frame, the former two voice data frame is read before the voice data frame "e." For example, the former two voice data frame may be represented as a voice data frame "c."

If the former two timestamp is not null, in block S510, the data reading module 14 sends the former two voice data frame to the VDSP 2.

Otherwise, if the former two timestamp is null, in block S512, the data reading module 14 sends a silence voice data frame to the VDSP 2.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for controlling a jitter buffer, the method comprising:
   a data writing step comprising: receiving a data packet that comprises a series of voice data frames, detecting whether the data packet is normally received according to a packet timestamp of the data packet, a voice timestamp of a voice data frame that is just read out from the jitter buffer, and a delay depth of the jitter buffer, and calculating a storage address for each of the voice data frames contained in the data packet according to the detection result;
   a data buffering step comprising: buffering the voice data frames, and storing each of the voice data frames in a corresponding storage address calculated in the data writing step; and
   a data reading step comprising: transmitting each of the voice data frames to a voice digital signal processor (VDSP) for playing.

2. The method of claim 1, wherein the data writing step and the data reading step are executed synchronously and repeatedly.

3. The method of claim 1, wherein the data writing step further comprises:
   detecting whether the data packet is the first received data packet;
   saving the data packet into a pre-buffering phase of the jitter buffer, and setting a reference timestamp for the first received data packet, if the data packet is the first received data packet;
   determining whether a difference between the packet timestamp and the reference timestamp is less than the delay depth of the jitter buffer, if the data packet is not the first received data packet;
   determining that the data packet is in the pre-buffering phase and buffering the data packet, if the difference is less than the delay depth;
   determining whether the packet timestamp is less than the voice timestamp, if the difference is not less than the delay depth;
   discarding the data packet and increasing a tuning delay depth of the jitter buffer by adding an adjustment value, if the packet timestamp is less than the voice timestamp; and
   determining whether the packet timestamp is greater than a sum value of the delay depth and the voice timestamp, if the packet timestamp is not less than the voice timestamp.

4. The method of claim 3, wherein the buffering step further comprises:
   storing the voice data frames and the voice timestamp of each of the voice data frames in a first storage address, if the packet timestamp is not greater than the sum value; and
   storing the voice data frames and the voice timestamp of each of the voice data frames in a second storage address if the packet timestamp is greater than the sum value, and increasing the tuning delay depth of jitter buffer with the adjustment value.

5. The method of claim 4, wherein the first storage address is calculated by a formula (TSw−TSr)/SPF+ReadIdx, wherein TSw represents the packet timestamp, TSr represents the voice timestamp of the voice data frame that is just read out from the jitter buffer, SPF represents a time interval between the voice data frames are transmitted, and ReadIdx represents a storage address of the voice data frame that is at a read position of the jitter buffer.

6. The method of claim 4, wherein the second storage address is calculated by a formula Dn/SPF+ReadIdx, wherein Dn represents the delay depth, SPF represents a time interval between the voice data frames are transmitted, and ReadIdx represents a storage address of the voice data frame that is at a read position of the jitter buffer.

7. The method of claim 4, wherein the adjustment value equals $SPF/2^n$, wherein SPF represents a time interval between the voice data frames are transmitted, and n is an integer that is between zero and eight.

8. The method of claim 3, further comprising:
   determining whether an absolute value of the tuning delay depth is greater than a time interval between the voice data frames are transmitted; and
   adjusting the delay depth of jitter buffer by increasing or decreasing the delay depth with one time interval if the absolute value of the tuning delay depth is greater than the time interval.

9. The method of claim 1, wherein the data reading step further comprises:
   detecting whether the jitter buffer is in a pre-buffering phase when the VDSP starts to play one of the voice data frames;

sending a silence voice data frame to the VDSP if the jitter buffer is in the pre-buffering phase, or detecting whether the voice timestamp is null if the jitter buffer is not in the pre-buffering phase;

setting the voice timestamp of the voice data frame to a sum value of a former timestamp and a time interval between the voice data frames are transmitted, recording one voice data frame to be played, and executing a voice data frame compensation on the jitter buffer if the voice timestamp is null; and sending the voice data frame that is at a read position of the jitter buffer to the VDSP and increasing a counter of the jitter buffer by one if the voice timestamp is not null.

10. The method of claim 9, wherein the voice data frame compensation comprises:

detecting whether the former timestamp of a former played voice data frame is null;

sending the former played voice data frame to the VDSP if the former timestamp is not null, or detecting whether a later timestamp of a later voice data frame is null if the former timestamp is null;

sending the later voice data frame to the VDSP if the later timestamp is not null, or detecting whether a former two timestamp of a former two voice data frame is null if the later timestamp is null; and sending the former two voice data frame to the VDSP if the former two timestamp is not null, or sending a silence voice data frame to the VDSP if the former two timestamp is null.

11. A jitter buffer, comprising:

a data writing module configured for receiving a data packet that comprises a series of voice data frames, detecting whether the data packet is normally received according to a packet timestamp of the data packet, a voice timestamp of a voice data frame just read out from the jitter buffer, and a delay depth of the jitter buffer, and calculating a storage address for each of the voice data frames contained in the data packet according to the detection result;

a data buffering module configured for buffering the voice data frames, and storing each of the voice data frames in a corresponding storage address calculated by the data writing module; and a data reading module configured for transmitting each of the voice data frames to a voice digital signal processor (VDSP) for playing.

12. The jitter buffer of claim 11, wherein the data writing module and the data reading module are executed synchronously and repeatedly.

13. The jitter buffer of claim 11, wherein the data reading module is further configured for detecting whether the jitter buffer is in a pre-buffering phase when the VDSP starts to play one of the voice data frames, and sending a silence voice data frame to the VDSP if the jitter buffer is in the pre-buffering phase.

14. The jitter buffer of claim 11, wherein the data reading module is further configured for setting the voice timestamp of the voice data frame to a sum value of a former timestamp and a time interval between the voice data frames are transmitted, recording one voice data frame to be played, and executing a voice data frame compensation on the jitter buffer if the voice timestamp is null.

15. The jitter buffer of claim 14, wherein the voice data frame compensation comprises:

detecting whether the former timestamp of a former played voice data frame is null;

sending the former played voice data frame to the VDSP if the former timestamp is not null, or detecting whether a later timestamp of a later voice data frame is null if the former timestamp is null;

sending the later voice data frame to the VDSP if the later timestamp is not null, or detecting whether a former two timestamp of a former two voice data frame is null if the later timestamp is null; and sending the former two voice data frame to the VDSP if the former two timestamp is not null, or sending a silence voice data frame to the VDSP if the former two timestamp is null.

* * * * *